(12) United States Patent
Kinefuchi et al.

(10) Patent No.: US 8,562,041 B2
(45) Date of Patent: Oct. 22, 2013

(54) BUMPER STRUCTURE

(75) Inventors: Masao Kinefuchi, Kobe (JP);
Tomokazu Nakagawa, Kobe (JP);
Takunori Yamaguchi, Kobe (JP); Mie Tachibana, Kakogawa (JP); Kenichi Watanabe, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/318,489

(22) PCT Filed: May 13, 2010

(86) PCT No.: PCT/JP2010/058137
§ 371 (c)(1),
(2), (4) Date: Nov. 2, 2011

(87) PCT Pub. No.: WO2010/131722
PCT Pub. Date: Nov. 18, 2010

(65) Prior Publication Data
US 2012/0043772 A1    Feb. 23, 2012

(30) Foreign Application Priority Data
May 14, 2009    (JP) .................................. 2009-117814

(51) Int. Cl.
*B60R 19/04*    (2006.01)

(52) U.S. Cl.
USPC ........................................ 293/102; 292/120

(58) Field of Classification Search
USPC ......... 293/102, 122, 117, 131, 132, 120, 121, 293/133
IPC ............................................. B60R 19/02, 19/04
See application file for complete search history.

(56) References Cited

U.S. PATENT DOCUMENTS 3,790,200 A * 2/1974 Kalitta .......................... 293/120
5,785,367 A * 7/1998 Baumann et al. ............. 293/133
(Continued)

FOREIGN PATENT DOCUMENTS

DE    199 04 630 A1    8/2000
DE    102 05 627 A1    8/2003
(Continued)

OTHER PUBLICATIONS

International Search Report Issued Jul. 13, 2010 in PCT/JP10/058137 Filed May 13, 2010.
(Continued)

*Primary Examiner* — Glenn Dayoan
*Assistant Examiner* — Pinel Romain
(74) *Attorney, Agent, or Firm* — Oblon, Spivak, McClelland, Maier & Neustadt, L.L.P.

(57) ABSTRACT

A bumper structure which as a whole has a reduced weight and which has sufficient buckling strength. A bumper structure has a box-like outer shape constituted of a front flange (2), a rear flange (3), an upper web (4), and a lower web (5) which consist of a steel material. An intermediate web (6) consisting of a material other than the steel material is disposed between the upper web (4) and the lower web (5). If the Young's modulus of the steel material is $E_1$, the density of the steel material is $\rho_1$, the Young's modulus of the material which forms the intermediate web (6) is $E_2$, and the density of the material which forms the intermediate web (6) is $\rho_2$, the bumper structure satisfies $E_1/\rho_1^3 < E_2/\rho_2^3$.

18 Claims, 8 Drawing Sheets

(56) References Cited

U.S. PATENT DOCUMENTS

| | | | |
|---|---|---|---|
| 6,003,912 A * | 12/1999 | Schonhoff et al. | 293/122 |
| 6,141,935 A * | 11/2000 | Artner et al. | 52/843 |
| 6,217,089 B1 * | 4/2001 | Goto et al. | 293/102 |
| 6,726,261 B2 * | 4/2004 | Goto et al. | 293/120 |
| 6,893,062 B2 * | 5/2005 | Amano et al. | 293/102 |
| 6,923,482 B2 * | 8/2005 | Cumming et al. | 293/102 |
| 7,044,516 B2 * | 5/2006 | Kobayashi et al. | 293/146 |
| 7,100,952 B2 * | 9/2006 | Reierson et al. | 293/102 |
| 7,537,252 B2 * | 5/2009 | Nagai et al. | 293/102 |
| 7,700,198 B2 | 4/2010 | Takeda et al. | |
| 7,926,868 B2 * | 4/2011 | Braunbeck et al. | 296/187.03 |
| 2004/0262930 A1 * | 12/2004 | Cumming et al. | 293/120 |
| 2006/0138790 A1 * | 6/2006 | Okabe et al. | 293/102 |
| 2011/0097595 A1 | 4/2011 | Takeda et al. | |

FOREIGN PATENT DOCUMENTS

| | | |
|---|---|---|
| DE | 10 2004 010 792 A | 12/2004 |
| DE | 10 2005 005 476 A1 | 8/2006 |
| EP | 0 734 908 A2 | 10/1996 |
| EP | 0 734 908 A3 | 10/1996 |
| JP | 06 286537 | 10/1994 |
| JP | 7-164983 | 6/1995 |
| JP | 10 044321 | 2/1998 |
| JP | 11 059296 | 3/1999 |
| JP | 11 170934 | 6/1999 |
| JP | 2000 052897 | 2/2000 |
| JP | 2003 129611 | 5/2003 |
| JP | 2003 252134 | 9/2003 |
| JP | 2003 312404 | 11/2003 |
| JP | 2004 148915 | 5/2004 |
| JP | 2004 161918 | 6/2004 |
| JP | 2005 088651 | 4/2005 |
| JP | 2006 248336 | 9/2006 |
| JP | 2008-189273 | 8/2008 |

OTHER PUBLICATIONS

Office Action issued Aug. 15, 2012 in Japanese Application No. 2009-117814 (With English Translation).

Supplementary European Search Report issued Sep. 7, 2012 in Application No. EP 10 77 4979.

"Overview of materials for Medium Carbon Steel", Matweb, URL: <http://www.matweb.com/search/DataSheet.aspx?MatGUID=098700ed63b24b14bd3bfdbec937489f>, XP002682990, Sep. 6, 2012.

"Overview of materials for 7000 Series Aluminum Alloy", Matweb, URL: <http://www.matweb.com/search/DataSheet.aspx?MatGUID=ab9706916818406b80c22b7f39db0c78&ckck=1>, XP002682991, Sep. 6, 2012.

"Aluminiumschaum—Technische Details", Alulight International GmbH, URL: <http://www.alulight.com/de/aluminiumschaum-technische-details>, XP002682992, Sep. 6, 2012.

"Duocel® Aluminum Foam", ERG Aerospace Corporation, URL: <http://www.ergaerospace.com/Aluminum-properties.htm>, XP002682993, Sep. 6, 2012.

"Properties of Aluminum", Advanced Aluminium Design Ltd., URL: <http://www.aadl.co.uk/properties-of-aluminium.html>, XP002682994, Sep. 6, 2012.

* cited by examiner

BUMPER STRUCTURE

TECHNICAL FIELD

The present invention relates to a bumper structure that has a box shape having a hollow space therein.

BACKGROUND ART

Hitherto, a bumper attached to the body of an automobile or the like is an example of a bending member on which a bending load due to external force acts, and is made of a thin material. Such a bumper is formed by shaping, for example, a steel sheet of 980 MPa class.

The main role of a bumper is to deform to absorb energy at the time of collision, to transmit the shock load to the left and right side members, and to cause the side members to absorb the energy at the time of collision by causing the side members to deform. That is to say, by causing the side members to deform and absorb energy, the deformation of the cabin of the automobile is prevented as designed, and the occupants are protected from shock.

Patent Literature 1 discloses an automotive bumper reinforcement in which the thickness of the part on the compression flange side of the bending neutral axis of webs forming a hollow rectangular section is larger than the thickness of the part on the tension flange side. Patent Literature 2 discloses an automotive bumper apparatus in which, of three ribs of a bumper reinforcement, an intermediate rib has a thickness larger than that of the other ribs, and the decline in energy absorption capability when the three ribs are buckled is thereby prevented. Patent Literature 3 discloses integrally forming a bumper having a two-part closed section by folding a single sheet.

Patent Literature 4 discloses a bending strength member in which an FRP (Fiber Reinforced Plastics) material is provided on the flange surface on the opposite side from the flange on which a bending load acts, and the ratio of the width to the thickness of the compression-side flange is 12 or less, and the amount of energy absorption is thereby increased. Patent Literature 5 discloses an automotive composite structure member including a steel tube and a reinforcing tube disposed within the steel tube so that the strength can be ensured, the reinforcing tube having an outer shape along the inner wall of the steel tube and having ribs formed therein.

Patent Literature 6 discloses a filling structure in which in order to ensure corrosion resistance, a filling material having a superior energy absorption capability is disposed within a hollow member and is fixed to the hollow member. Patent Literature 7 discloses a car body structure member that is formed of a plurality of members having different strength such that a torsional moment is generated, in order to improve the energy absorption efficiency by distributing a bending load to other members. Patent Literature 8 discloses a bumper structure in which a crush preventing member is disposed within a hollow portion of a bumper reinforcing plate, in order to improve the shock energy absorption capability due to buckling deformation.

CITATION LIST

Patent Literature

PTL 1: Japanese Unexamined Patent Application Publication No. 11-59296
PTL 2: Japanese Unexamined Patent Application Publication No. 2004-148915
PTL 3: Japanese Unexamined Patent Application Publication No. 11-170934
PTL 4: Japanese Unexamined Patent Application Publication No. 2003-129611
PTL 5: Japanese Unexamined Patent Application Publication No. 2003-312404
PTL 6: Japanese Unexamined Patent Application Publication No. 2005-88651
PTL 7: Japanese Unexamined Patent Application Publication No. 2006-248336
PTL 8: Japanese Unexamined Patent Application Publication No. 2000-52897

SUMMARY OF INVENTION

Technical Problem

In a bumper structure, if compression buckling of webs (wall portions extending in the front-rear direction) occurs, the sectional performance cannot be exerted fully, and the bending strength decreases. The strength of the webs against buckling is proportional to the Young's modulus of the material forming the webs and the cube of the thickness of the webs. For this reason, for preventing buckling, increasing the thickness is more efficient than using a strong material.

However, if the thickness is simply increased as in Patent Literatures 1 and 2, the weight may become excessive. In particular, a bumper made of steel is often formed by roll forming. In this case, the whole bumper has the same thickness. Therefore, if the thickness is increased in order to prevent the buckling of the webs, the overall weight increases in proportion to the increase, and therefore the durability performance per weight against buckling is not noticeably improved.

There are manufacturing difficulties in attaching an addition having a relatively complex structure to the inside of a bumper as in Patent Literatures 5 to 8. In addition, in the case where a large addition is attached, the increase in weight is a problem. It can hardly be expected that FRP such as that in Patent Literature 4 prevents buckling due to compression. In the case where these additions are used, the increase in cost becomes excessive.

Using a closed section structure made by roll forming as in Patent Literature 3 is proposed. If such a closed section is used, the bending strength (full plastic moment) can be improved in theory. However, for the buckling of the webs, another efficient improvement of strength is necessary.

An object of the present invention is to provide a bumper structure the overall weight of which can be reduced and the bending strength of which can be ensured.

Solution to Problem

The present invention relates to a bumper structure having a box shape having a hollow space therein. The present invention includes a front flange and a rear flange made of metal and forming the front surface and the rear surface of the bumper, and an upper web and a lower web made of metal and forming the upper surface and the lower surface of the bumper, the front flange, the rear flange, the upper web, and the lower web being connected to each other so as to form the box shape, and an intermediate web made of metal and connected to the front flange and the rear flange between the upper web and the lower web such that the hollow space is divided into an upper portion and a lower portion. Of the front flange, the rear flange, the upper web, the lower web, and the intermediate web, at least one of the upper web, the lower web, and the intermediate web is made of a second material, and the others are made of a first material. If the Young's modulus and density of the first material are denoted as $E_1$ and $\rho_1$, respectively, and the Young's modulus and density of the second material are denoted as $E_2$ and $\rho_2$, respectively, $E_1/\rho_1^3 < E_2/\rho_2^3$ is satisfied.

According to the bumper structure of the present invention, at least one of three webs is made of a second material that satisfies $E_1/\rho_1^3 < E_2/\rho_2^3$. Such a material is a material by which the buckling strength per weight can be ensured easily compared to the first material. For this reason, a bumper structure in which the overall weight of the bumper can be reduced and the buckling strength of the webs can be ensured can be fabricated.

In the present invention, it is preferable that the intermediate web be made of the second material. In this case, because the web located in the middle in the top-bottom direction is made of the second material, the overall balance of strength can be ensured.

In the present invention, it is preferable that all of the upper web, the lower web, and the intermediate web be made of the second material. In this case, the overall weight can be reduced while ensuring the buckling strength per weight.

In the present invention, it is preferable that the intermediate web be made of the second material, and a reinforcing plate made of metal be fixed to each of the surface of the corner formed by the front flange and the upper web and the surface of the corner formed by the front flange and the lower web, the reinforcing plate being bent into a hook shape along the corner. In this case, the bending strength can be ensured.

In the present invention, it is preferable that if, of the front flange, the rear flange, the upper web, the lower web, and the intermediate web, the thickness of the web made of the second material is $t_2$, and the thickness of the part made of the first material is $t_1$, $t_2 \leq (\rho_1/\rho_2) \cdot t_1$ be satisfied. In this case, compared to the case where the whole bumper is made of the first material, the weight can be reduced while keeping the buckling strength of the webs.

In the present invention, it is preferable that if, of the front flange, the rear flange, the upper web, the lower web, and the intermediate web, the thickness of the web made of the second material is $t_2$, the thickness of the part made of the first material is $t_1$, the yield stress of the first material is $\sigma y_1$, and the yield stress of the second material is $\sigma y_2$, $(t_2 \cdot \sigma y_2)/(t_1 \cdot \sigma y_1) \geq 0.5$ be satisfied. In this case, the bending strength can be ensured further.

DESCRIPTION OF EMBODIMENTS

The embodiment of the present invention will now be described with reference to the drawings.

Figure 1:
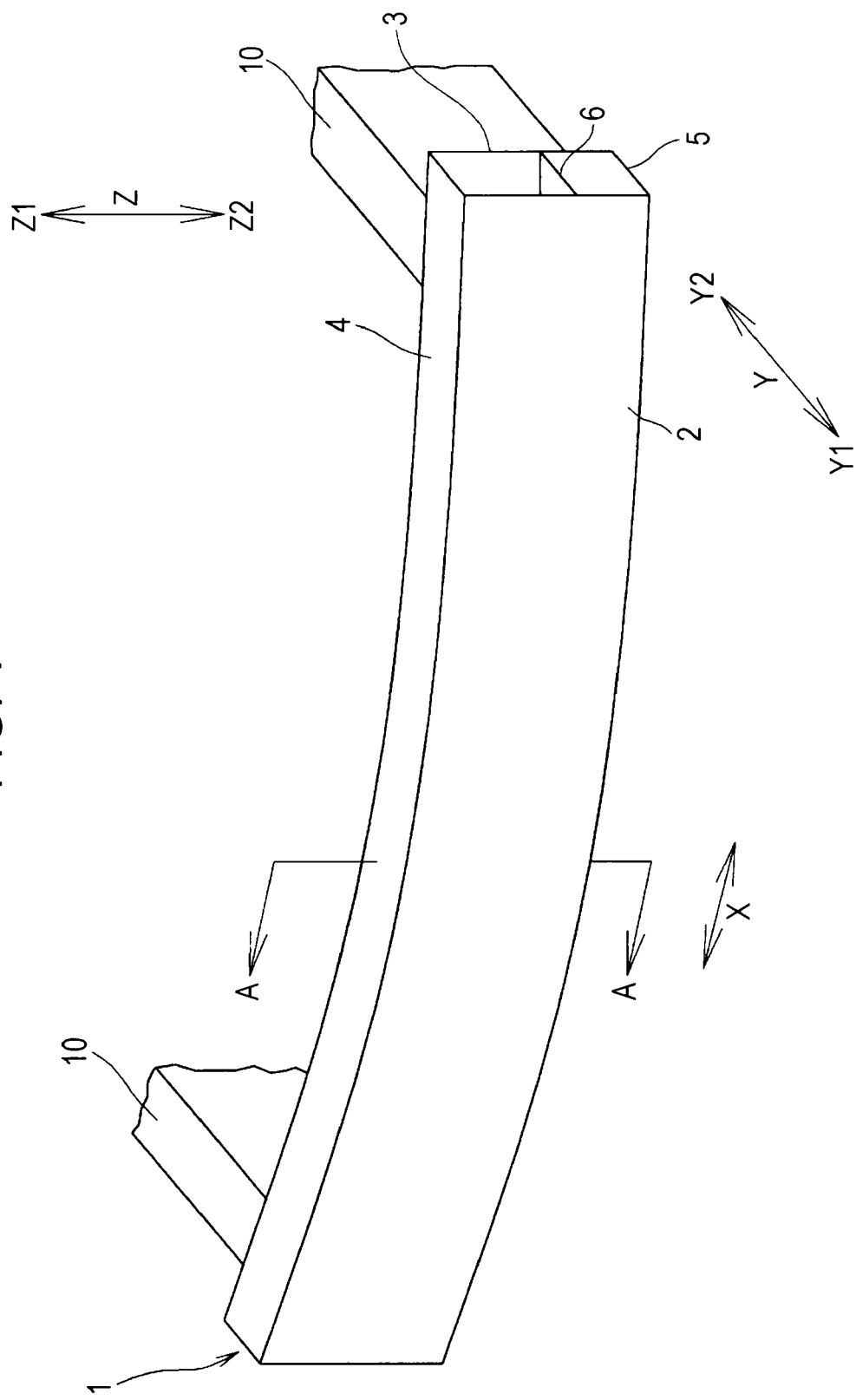
FIG. 1 is a schematic perspective view showing a bumper according to an embodiment of the present invention.

FIG. 1 is a schematic perspective view showing a bumper 1 according to an embodiment of the present invention. This embodiment includes a first to fourth examples as concrete examples of bumper 1, and FIG. 1 shows the structure common to these. FIGS. 2 to 5 show first to fourth examples, respectively, as a schematic sectional view taken along line A-A of the bumper 1 shown FIG. 1. This sectional view taken along line A-A corresponds to a section cut by a plane perpendicular to the longitudinal direction of the bumper 1. Hereinafter, the direction shown by arrow X in FIG. 1 will be referred to as the width direction of the vehicle, the direction shown by arrow Y in FIG. 1 will be referred to as the front-rear direction of the vehicle (Y1: front, Y2: rear), and the direction shown by arrow Z in FIG. 1 will be referred to as the top-bottom direction of the vehicle (Z1: top, Z2: bottom).

(Outline of Bumper 1)

First, the structure common to the first to fourth examples in this embodiment will be described. As shown in FIG. 1, the bumper 1 according to this embodiment is a box-like member extending in the width direction of the vehicle, and is attached to the front ends of side members 10 extending in the front-rear direction of the vehicle.

As shown in FIGS. 1 to 5, the bumper 1 has a front flange 2 located in the front of the vehicle, a rear flange 3 located behind the front flange 2, and three webs (an upper web 4, lower web 5, and intermediate web 6) connecting the front flange 2 and the rear flange 3. These flanges and webs are each formed in a plate shape.

The front flange 2 is a plate-like portion that forms the front surface of the bumper 1. The rear flange 3 is a plate-like portion that forms the rear surface of the bumper 1, and is disposed so as to face the front flange 2 substantially parallel thereto. The rear flange 3 is fixed to the front ends of the side members 10. As shown in FIG. 1, in this embodiment, the front flange 2 and the rear flange 3 are slightly curved plates. However, the present invention is not limited to this case, and the front flange 2 and the rear flange 3 may be, for example, flat plates.

The upper web 4 is a plate-like portion that forms the upper surface of the bumper 1 and connects the upper end of the front flange 2 and the upper end of the rear flange 3. The lower web 5 is a plate-like portion that forms the lower surface of the bumper 1 and connects the lower end of the front flange 2 and the lower end of the rear flange 3. By these front flange 2, rear flange 3, upper web 4, and lower web 5, the box-like outer shape of the bumper 1 is formed. The intermediate web 6 is a plate-like portion provided in a space within the bumper 1 and connects the middle in the top-bottom direction of the front flange 2 and the middle in the top-bottom direction of the rear flange 3. The intermediate web 6 divides the space within the bumper 1 into two (upper and lower) spaces 7 and 8. The webs 4 to 6 are all disposed substantially perpendicularly to the front flange 2 and the rear flange 3, and are equal to each other in the length in the Y direction.

(Structure of Each Example)

Next, the first to fourth examples will be described in more detail. Hereinafter, the bumpers 1 in the first to fourth examples will be referred to as "bumper 1a" to "bumper 1d," respectively, to distinguish them from each other.

Figure 2:
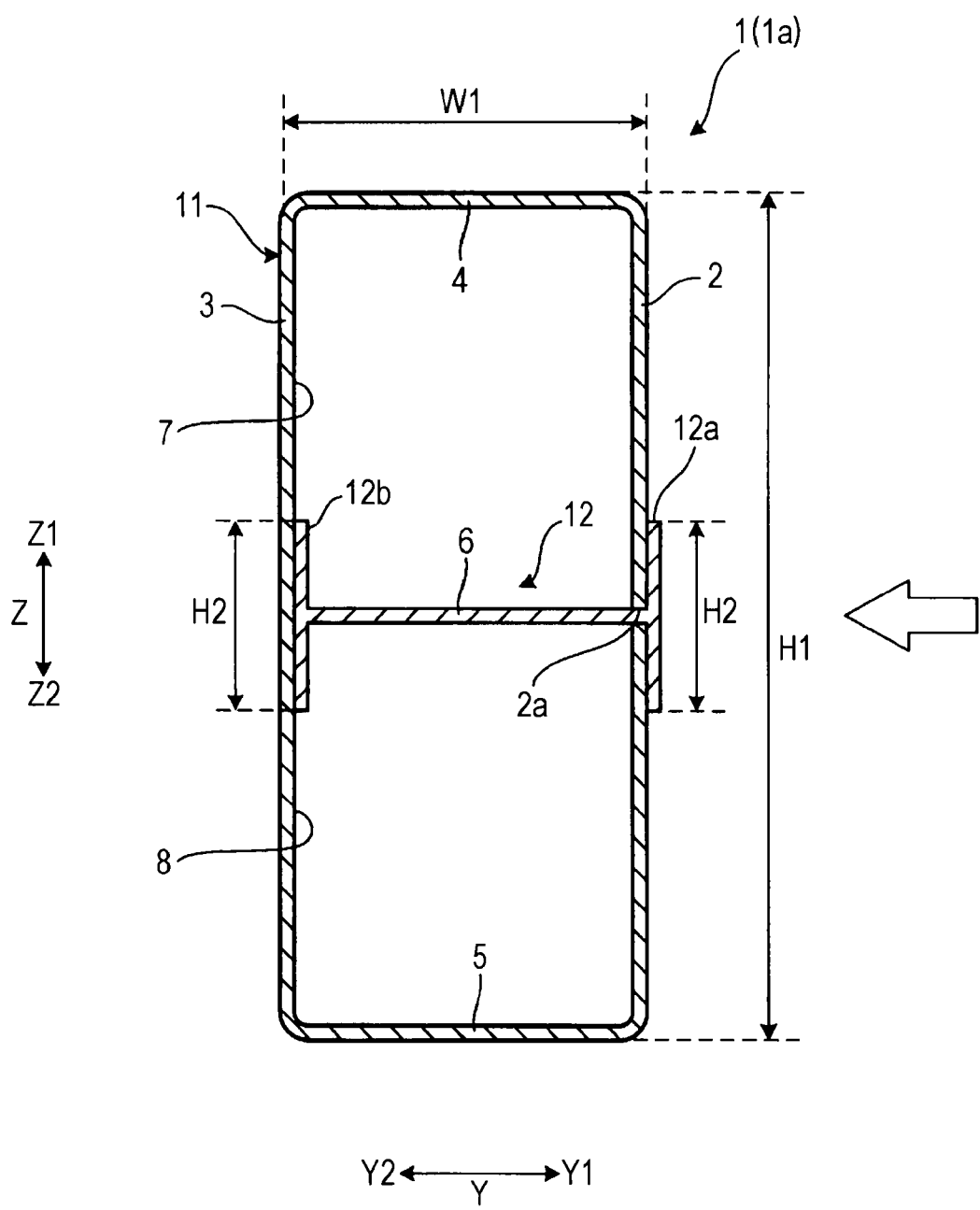
FIG. 2 is a sectional view taken along line A-A of FIG. 1 according to a first example.

As shown in FIG. 2, the bumper 1a of the first example has an outer shape member 11 and an intermediate member 12. The outer shape member 11 is a member that forms the outer shape of the bumper 1a in the first example, and has a front flange 2, a rear flange 3, an upper web 4, and a lower web 5. The outer shape member 11 is made by shaping a sheet made of steel (first material). In this embodiment, a steel material having a Young's modulus of 21000 MPa and a density of 7874 kg/m³ is used.

The intermediate member 12 is a member having an intermediate web 6, and joining plates 12a and 14 connected to both ends of the intermediate web 6, and having an "H"-shaped sectional shape. The intermediate member 12 is disposed in the middle in the top-bottom direction of the bumper 1a. The intermediate web 6 protrudes forward from the inside of the outer shape member 11 through a through-hole 2a formed in the front flange 2, and is connected to the joining plate 12a in front of the front flange 2. The joining plate 12a extends along the front flange 2 and is joined to the front surface of the front flange 2. The connecting plate 12b extends along the rear flange 3 and is joined to the front surface of the rear flange 3.

The intermediate member 12 is made of a metal material (second material) different from the outer shape member 11, for example, aluminum alloy. Let the Young's modulus and density of the material forming the outer shape member 11 be denoted as $E_1$ and $\rho_1$, respectively, and the Young's modulus and density of the material forming the intermediate member 12 be denoted as $E_2$ and $\rho_2$, respectively. The material forming the intermediate member 12 is selected from materials that satisfy the following relationship (Expression 1).

$$E_1/\rho_1^3 < E_2/\rho_2^3 \qquad \text{(Expression 1)}$$

Figure 3:
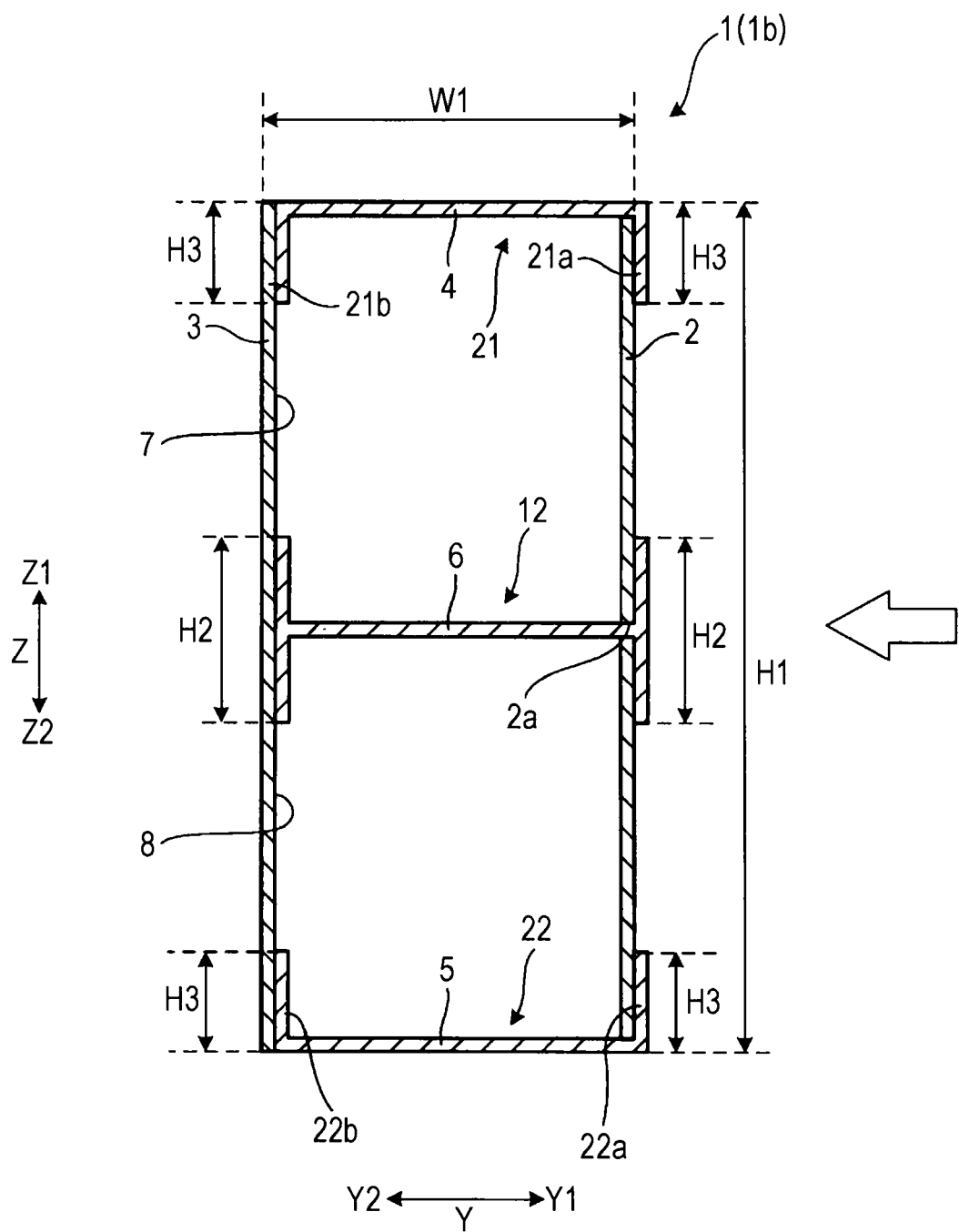
FIG. 3 is a sectional view taken along line A-A of FIG. 1 according to a second example.

As shown in FIG. 3, the bumper 1b of the second example has a front flange 2, a rear flange 3, an upper member 21, a lower member 22, and an intermediate member 12. Of these, the intermediate member 12 in the second example has the same structure as the intermediate member 12 in the first example, and is joined to the front flange 2 and the rear flange 3 in the same manner.

The upper member 21 in the second example has an upper web 4, and joining plates 21a and 21b connected to both ends of the upper web 4, and has an inverted "U"-shaped sectional shape. The joining plate 21a extends along the front flange 2 and is joined to the front surface of the front flange 2. The joining plate 21b extends along the rear flange 3 and is joined to the front surface of the rear flange 3.

The lower member 22 has a lower web 5, and joining plates 22a and 22b connected to both ends of the lower web 5, and has a "U"-shaped sectional shape. The joining plate 22a extends along the front flange 2 and is joined to the front surface of the front flange 2. The joining plate 22b extends along the rear flange 3 and is joined to the front surface of the rear flange 3.

Whereas the front flange 2 and the rear flange 3 are made of steel, the upper member 21 and the lower member 22 are made of a metal material such as aluminum alloy like the intermediate member 12. If the Young's modulus and density of the material forming the front flange 2 and the like are denoted as $E_1$ and $\rho_1$, respectively, and the Young's modulus and density of the material forming the upper member 21 and the like are denoted as $E_2$ and $\rho_2$, respectively, the above relationship (Expression 1) is satisfied as in the first example.

Figure 4:
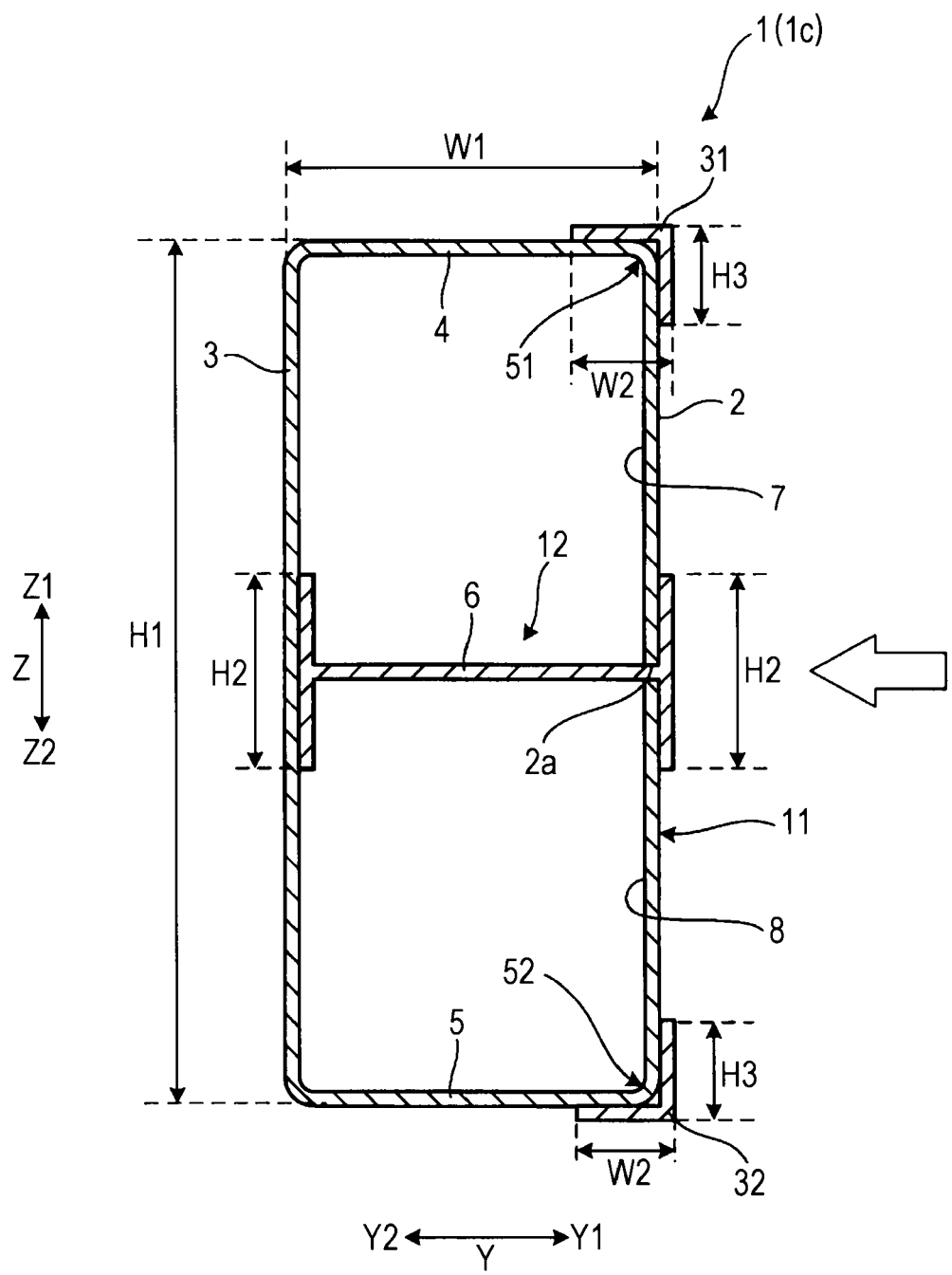
FIG. 4 is a sectional view taken along line A-A of FIG. 1 according to a third example.

As shown in FIG. 4, the bumper 1c of the third example is provided with reinforcing plates 31 and 32 in addition to the bumper 1a of the first example. The reinforcing plate 31 is provided at the corner 51 formed at the connection between the front flange 2 and the upper web 4, and has a shape bent into a hook along the corner 51. The portion of the reinforcing plate 31 along the front flange 2 is joined to the front surface of the front flange 2, and the portion of the reinforcing plate 31 along the upper web 4 is joined to the upper surface of the upper web 4.

The reinforcing plate 32 is provided at the corner 52 formed at the connection between the front flange 2 and the lower web 5, and has a shape bent into a hook along the corner 52. The portion of the reinforcing plate 32 along the front flange 2 is joined to the front surface of the front flange 2, and the portion of the reinforcing plate 32 along the lower web 5 is joined to the lower surface of the lower web 5.

The reinforcing plates 31 and 32 are made of a metal material such as aluminum alloy like the intermediate member 12. If the Young's modulus and density of the steel material forming the front flange 2 and the like are denoted as $E_1$ and $\rho_1$, respectively, and the Young's modulus and density of the material forming the reinforcing plate 31 and the like are denoted as $E_2$ and $\rho_2$, respectively, the above relationship (Expression 1) is satisfied as in the first example.

Figure 5:
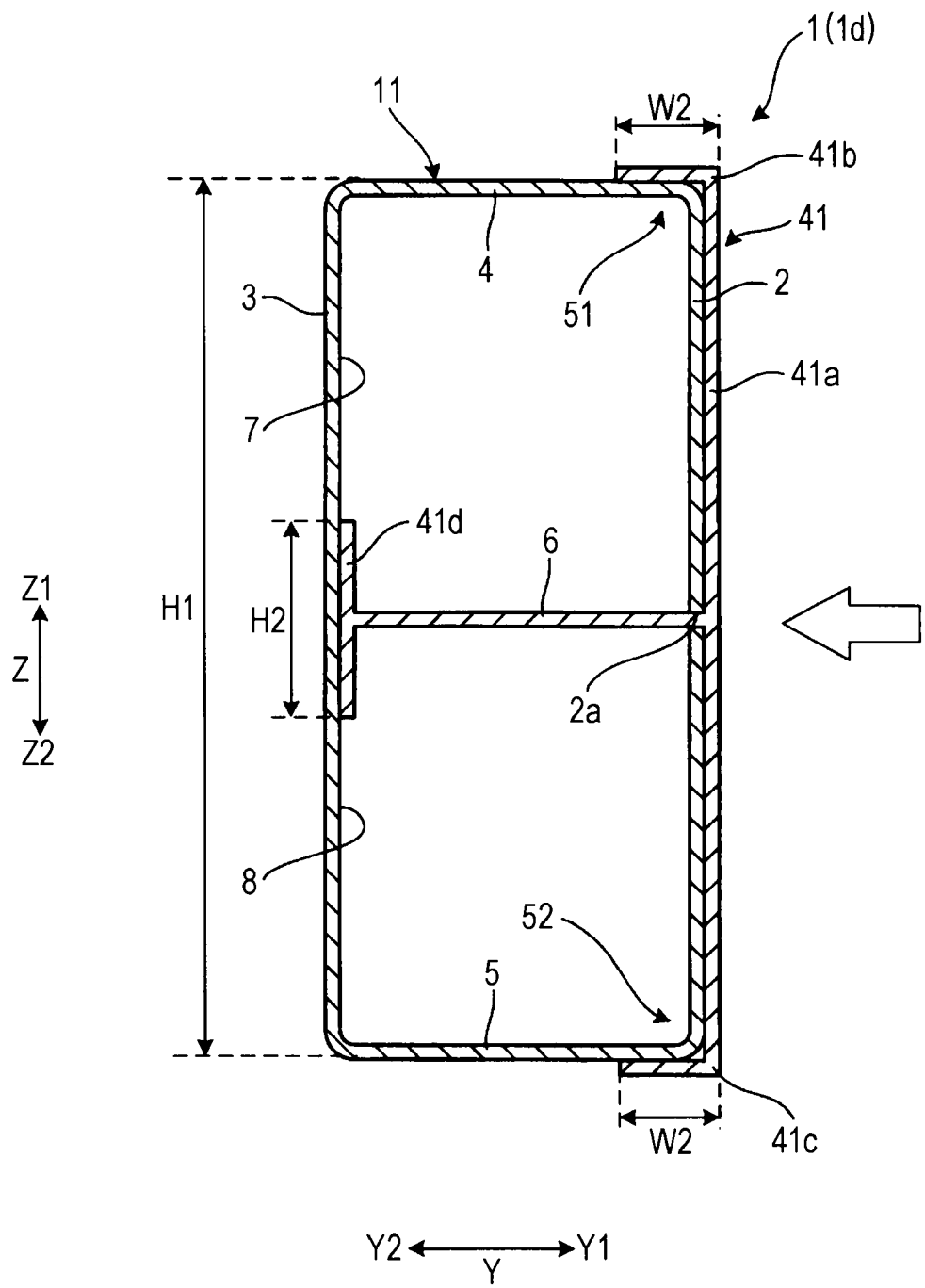
FIG. 5 is a sectional view taken along line A-A of FIG. 1 according to a fourth example.

As shown in FIG. 5, the bumper 1d of the fourth example has such a reinforcing plate 41 that the intermediate member 12 and the reinforcing plates 31 and 32 in the third example are integrated. The reinforcing plate 41 has a joining plate 41a joined to the front surface of the front flange 2. The joining plate 41a extends from the upper end to the lower end of the front flange 2. At the upper end of the joining plate 41a, a bent portion 41b is formed that is bent into a hook from the portion along the front flange 2 into the direction along the upper web 4. The bent portion 41b is joined to the upper surface of the upper web 4. At the lower end of the joining plate 41a, a bent portion 41c is formed that is bent into a hook from the portion along the front flange 2 into the direction along the lower web 5. The bent portion 41c is joined to the lower surface of the lower web 5. By the bent portions 41b and 41c, the corners 51 and 52 of the outer shape member 11 are reinforced.

The intermediate web 6 protrudes forward through a through-hole 2a formed in the front flange 2, is connected to the joining plate 41a, and forms a part of the reinforcing plate 41. To the rear end of the intermediate web 6, a joining plate 41d is connected. The joining plate 41d is joined to the front surface of the rear flange 3.

The reinforcing plate 41 is made of a metal material such as aluminum alloy. If the Young's modulus and density of the steel material forming the front flange 2 and the like are denoted as $E_1$ and $\rho_1$, respectively, and the Young's modulus and density of the material forming the reinforcing plate 41 and the like are denoted as $E_2$ and $\rho_2$, respectively, the above relationship (Expression 1) is satisfied as in the first example.

(Selection of Material)

As described above, the bumpers according to the first to fourth examples are provided with portions made of steel and portions made of a material other than steel, such as aluminum alloy. In the portions made of a material other than steel, the strength can be efficiently ensured by keeping down the weight and ensuring a strength comparable to steel. In the case where a material satisfying the above Expression 1 is selected, as described below, it is easy to efficiently ensure the buckling strength of the webs.

Suppose that a bending load along the white arrows of FIGS. 2 to 5 is applied to the bumper 1a according to the first to fourth examples. In this case, buckling due to the compression in the Y direction may occur in the upper web 4, the lower web 5, and the intermediate web 6. If the thickness of the webs is denoted as t, and the Young's modulus of the material forming the webs is denoted as E, the buckling load Pcr of the webs satisfies the following relationship (Expression 2). Suppose that the webs are equal in the length in the Y direction corresponding to the buckling length.

$$Pcr \propto E \cdot t^3 \quad \text{(Expression 2)}$$

From Expression 2, it can be seen that the buckling load is proportional to the Young's modulus and the cube of the thickness. Therefore, in the case where the following Expression 3 is satisfied, the strength of the webs made of a material other than steel can be improved. Let the Young's modulus of steel be denoted as $E_1$, the thickness of the part made of steel be denoted as $t_1$, the Young's modulus of the material forming the part made of a material other than steel be denoted as $E_2$, and the thickness of the part be denoted as $t_2$.

$$E_1 \cdot t_1^3 < E_2 \cdot t_2^3 \quad \text{(Expression 3)}$$

If the density of the webs is denoted as ρ, and the dimensions other than thickness are unchanged, the weight W of the web is expressed by the following Expression 4.

$$W \propto \rho \cdot t \quad \text{(Expression 4)}$$

Therefore, in order to obtain the same weight as in the case where the webs are made of steel also when the webs are made of a material other than steel, Expression 5 is derived.

$$\rho_1 \cdot t_1 = \rho_2 \cdot t_2 \quad \text{(Expression 5)}$$

From the above Expressions 5 and 3, the above relationship of Expression 1 is derived. Therefore, it can be seen that in the case where a material satisfying Expression 1 is selected, and if the webs are formed so as to have such a thickness that the webs have about the same weight, the strength can be improved reliably, and therefore the buckling load per weight ($P_{cr}/W$) can be improved efficiently.

For example, as described above, the Young's modulus of steel is 21000 MPa, and the density of steel is 7874 kg/m³. In this case, the left side of Expression 1 is $21000/7874^3 = 4.302 \times 10^{-8}$. Suppose that for example, aluminum alloy having a Young's modulus of 6900 MPa and a density of 2700 kg/m³ is used as a material other than steel. In this case, the right side of Expression 1 is $6900/2700^3 = 3.506 \times 10^{-7}$. Therefore, the above Expression 1 is satisfied, and therefore efficient improvement of strength can be expected. Expression 1 can also be satisfied by aluminum alloy of 7000 series, and therefore efficient improvement of strength against buckling can be expected.

When a material other than steel is used, in order to reduce the weight compared to the case where steel is used, the following Expression 6 is derived from Expression 5. Therefore, in order to reduce the weight, it is preferable to set the material and thickness such that Expression 6 is satisfied.

$$t_2 \leq (\rho_1/\rho_2) \cdot t_1 \quad \text{(Expression 6)}$$

In the case where a bending load along the white arrows of FIGS. 2 to 5 is applied to the bumper, and if the webs yield to the compressive force acting on the webs, the bumper can no longer resist the load. In order to prevent this, and in order to prevent the strength of the webs from decreasing more than necessary in the case where the material is changed from steel, an A value is defined by the following Expression 7 as a standard for ensuring the strength to sufficiently withstand yielding. Here, $\sigma y_1$ is the yield stress of steel, and $\sigma y_2$ is the yield stress of a material other than steel. In order for the part made of a material other than steel to have sufficient strength, the A value needs to be a predetermined value or more. The specific conditions of the A value will be described later.

$$A = (t_2 \cdot \sigma y_2)/(t_1 \cdot \sigma y_1) \quad \text{(Expression 7)}$$

(Results of Simulation of Bending Moment)

Next, the results of an analysis of the bending strength performed about the above-described first to fourth examples will be described. In this analysis, the bumpers 100 and 200 shown in FIGS. 6 (a) and 6 (b) are first and second comparative examples.

Figure 6:
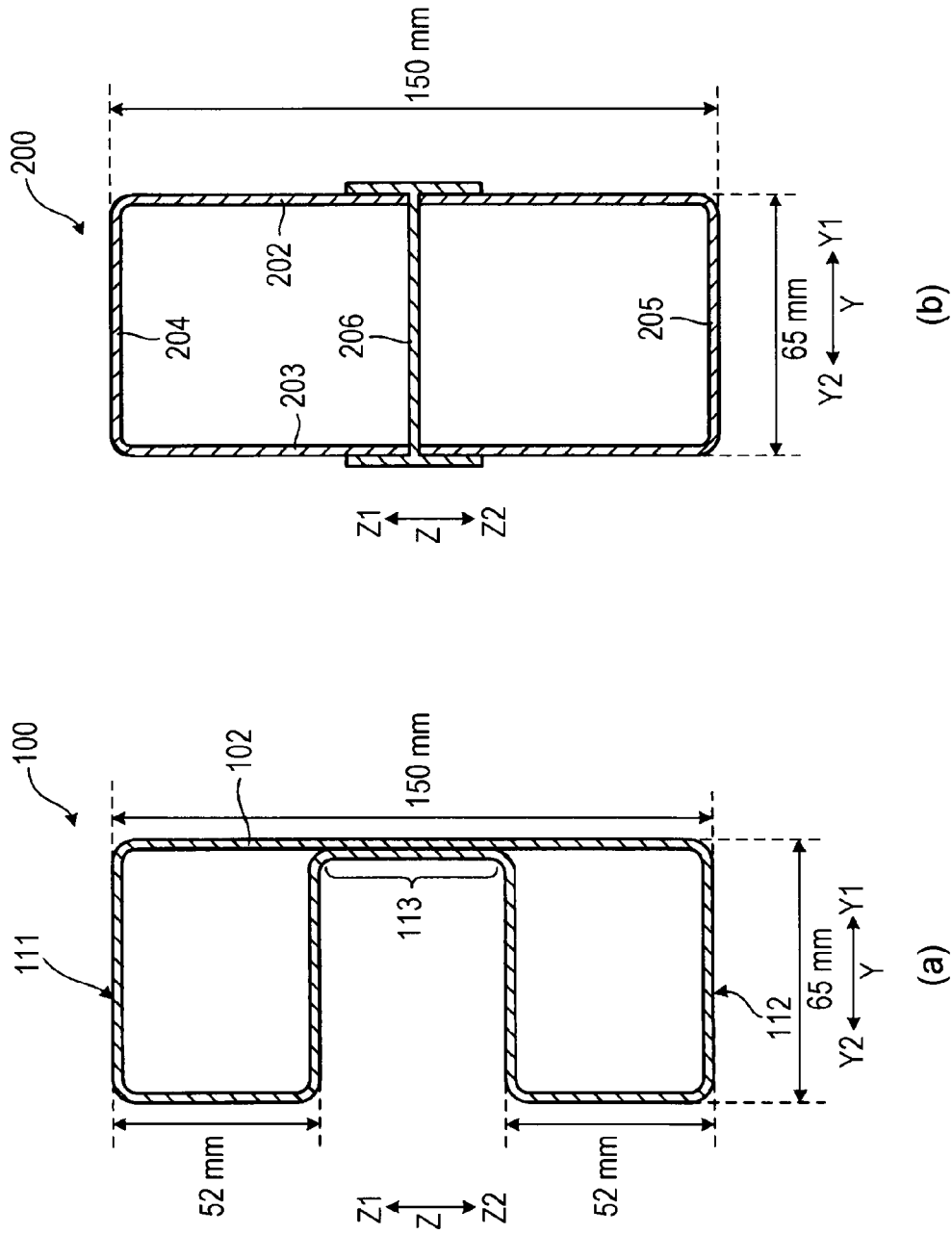
FIG. 6 (a) is a vertical sectional view of a bumper according to a first comparative example, and FIG. 6 (b) is a vertical sectional view of a bumper according to a second comparative example.

In the bumper 100 according to the first comparative example, unlike the first to fourth examples, the whole bumper is made of steel. As shown in FIG. 6 (a), the bumper 100 according to the first comparative example differs from the first to fourth examples in basic sectional shape. The bumper 100 is 150 mm in overall height and 65 mm in overall width and has a generally box-like shape.

The bumper 100 has a protruding portion 111 formed by rearward bending a portion connected to the upper end of a front flange 102, and a protruding portion 112 formed by rearward bending a portion connected to the lower end of the front flange 102. The protruding portions 111 and 112 both have a rectangular sectional shape. The portion bent rearward from the front flange 102 is joined to the rear surface of the front flange 102 in an intermediate portion 113 located between the protruding portions 111 and 112. The height of the protruding portions 111 and 112 is 52 mm as shown in FIG. 6 (a).

In the bumper 200 according to the second comparative example, the whole bumper is made of steel as in the first comparative example. The sectional shape of the bumper 200 is almost the same as that of the bumper 1a of the first example but differs from the first example in that an intermediate member 206 having an "H"-shaped sectional shape penetrates not only a front flange 202 but also a rear flange 203. The bumper 200 is 150 mm high and 65 mm wide. In this analysis, as shown in the following Table 3, each value in the case where the thickness of steel is 1.4 mm in each comparative example and in the case where the thickness of steel is 2.0 mm in each comparative example was calculated.

The dimensions H1 to H3, W1, and W2 of each part of the first to fourth examples used in this analysis are as shown in the following Tables 1 and 2. As shown in Table 4, in this analysis, in the first to fourth examples, the thickness of the steel part is 1.4 mm. In the first example, each value in each of the cases where the thickness of the webs made of aluminum alloy is 2.0 mm, 3.0 mm, and 3.6 mm was calculated. In the second to fourth examples, each value in the cases where the thickness of the webs made of aluminum alloy is 3.6 mm was calculated. In the first example, in the case where the thickness of the webs made of aluminum alloy is 3.6 mm, each value in each of the cases where the aluminum alloy is 7000 series and 6000 series was calculated. In the third example, the thickness of the reinforcing plates 31 and 32 is 3.0 mm. In the fourth example, each value in each of the cases where the thickness of the joining plate 41a and the bent portions 41b and 41c is 3.0 mm and 2.0 mm was calculated.

Figure 7:
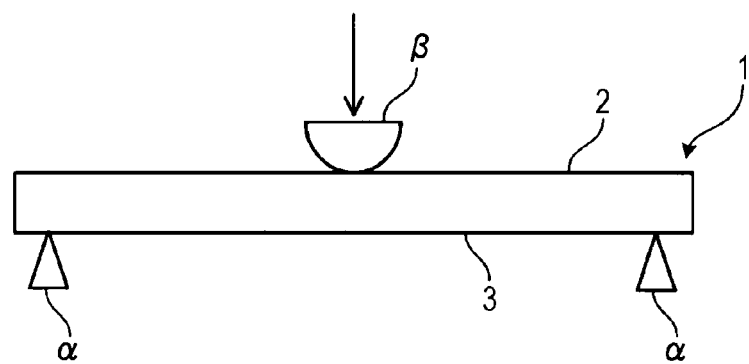
FIG. 7 illustrates a three-point bending test used in the analysis of the strength of the bumper.

By performing a three-point bending test as shown in FIG. 7 on the basis of the above conditions, the bending strength in the bumpers 1a to 1d according to the first to fourth examples and the bending strength in the first and second comparative examples were calculated. In FIG. 7, the bumper 1 is simply supported at both ends by supporting portions α from the rear flange 3 side. At the midpoint between the two supporting portions α, an arcuate surface of a presser β is brought into contact from the front flange 2 side, and the presser is pressed in a direction (the arrow direction in FIG. 7) perpendicular to the longitudinal direction of the bumper beam. When the load reaches a level with the increase in the load applied from the presser β, the whole section of the bumper 1 yields due to bending, or buckling occurs in part of the section. The load just before such yield or buckling occurs is the maximum load applied from the presser β. Hereinafter, the bending moment at the contact position of the presser β where the bending moment is largest when the maximum load is applied will be referred to as "ultimate moment." The ultimate moment was calculated on the basis of the measured maximum load.

Table 3 shows the results of this analysis about the first and second comparative examples. Table 4 shows the results of this analysis about the first to fourth examples. In Table 4, the A value shows the value of $(t_2 \cdot \sigma y_2)/(t_1 \cdot \sigma y_1)$. Here, $\sigma y_1$ denotes the yield stress of steel, and $\sigma y_2$ denotes the yield stress of aluminum alloy.

The "weight ratio" shown in Tables 3 and 4 is the ratio of the weight of each comparative example and each example to the weight of the first comparative example when the thickness of the steel part is 1.4 mm. The "ultimate moment ratio" shown in Tables 3 and 4 is based on the calculation results based on the above three-point bending test, and is the ratio of the ultimate moment of each comparative example and each example to the first ultimate moment when the thickness of the steel part is 1.4 mm.

In Table 4, "fourth (3.0)" means the fourth example in the case where the thickness of the joining plate 41a and the bent portions 41b and 41c is 3.0 mm, and "fourth (2.0)" means the fourth example in the case where the thickness of the joining plate 41a and the bent portions 41b and 41c is 2.0 mm.

TABLE 1

| W1 | W2 |
|---|---|
| 65 mm | 20 mm |

TABLE 2

| H1 | H2 | H3 |
|---|---|---|
| 150 mm | 30 mm | 20 mm |

TABLE 3

| Comparative example | Steel part thickness [mm] | Weight ratio | Ultimate moment ratio |
|---|---|---|---|
| First | 1.4 | 1.00 | 1.00 |
|  | 2.0 | 1.41 | 1.82 |
| Second | 1.4 | 0.95 | 1.06 |
|  | 2.0 | 1.23 | 1.67 |

TABLE 4

| Example | Steel part thickness [mm] | Type of aluminum | Aluminum web thickness [mm] | A value | Weight ratio | Ultimate moment ratio |
|---|---|---|---|---|---|---|
| First | 1.4 | 7000 series | 3.6 | 0.77 | 0.92 | 1.14 |
|  | 1.4 |  | 3.0 | 0.64 | 0.91 | 1.07 |
|  | 1.4 |  | 2.0 | 0.43 | 0.85 | 0.96 |
|  | 1.4 | 6000 series | 3.6 | 0.45 | 0.92 | 0.92 |

TABLE 4-continued

| Example | Steel part thickness [mm] | Type of aluminum | Aluminum web thickness [mm] | A value | Weight ratio | Ultimate moment ratio |
|---|---|---|---|---|---|---|
| Second | 1.4 | 7000 series | 3.6 | 0.77 | 0.90 | 1.47 |
| Third | 1.4 |  | 3.6 | 0.77 | 0.98 | 1.51 |
| Fourth (3.0) | 1.4 |  | 3.6 | 0.77 | 1.10 | 1.80 |
| Fourth (2.0) | 1.4 |  | 3.6 | 0.77 | 1.03 | 1.59 |

Figure 8:
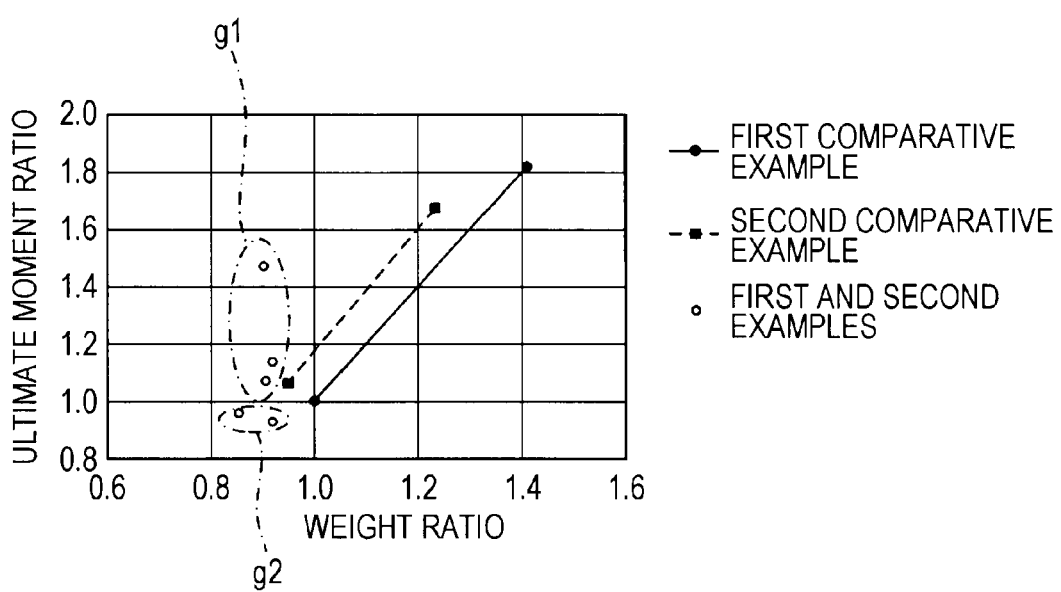
FIG. 8 is a graph plotting the results of analysis of the first and second examples and the first and second comparative examples.
Figure 9:
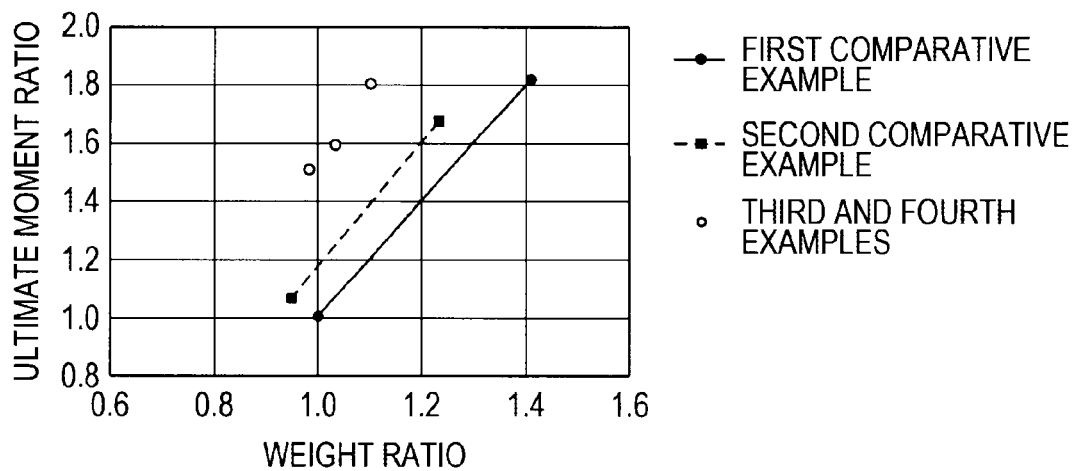
FIG. 9 is a graph plotting the results of analysis of the third and fourth examples and the first and second comparative examples.

FIG. 8 shows, on the basis of Tables 3 and 4, the results of analysis of the first and second comparative examples and the first and second examples. FIG. 9 shows, on the basis of Tables 3 and 4, the results of analysis of the first and second comparative examples and the third and fourth examples.

As shown in FIG. 8, in the second comparative example, the ultimate moment ratio per weight ratio is improved compared to the first comparative example.

As shown in FIG. 8, in the example surrounded by the long dashed short dashed line g1, the ultimate moment ratio per weight ratio is improved compared to the first and second comparative examples. That is to say, in the first example, in the case where the intermediate web 6 is made of aluminum alloy of 7000 series and the thickness of the intermediate web 6 is 3.0 mm or 3.6 mm, the bending strength per weight is improved efficiently. In the second example in which all of the webs (upper web 4, lower web 5, and intermediate web 6) are made of aluminum alloy of 7000 series, the bending strength per weight is most improved.

In the example surrounded by the long dashed short dashed line g2, the ultimate moment ratio was below 1.0. That is to say, it is shown that in the first example, in the case where the intermediate web 6 is made of aluminum alloy of 7000 series and the thickness of the intermediate web 6 is 2.0 mm, and in the case where the intermediate web 6 is made of aluminum alloy of 6000 series and the thickness of the intermediate web 6 is 3.6 mm, the weight can be reduced compared to the first and second comparative examples, but the bending strength cannot be improved.

As shown in FIG. 9, in the third and fourth examples, the ultimate moment ratio per weight ratio is improved compared to the first and second comparative examples. That is to say, it is shown that in the third and fourth examples, the strength per weight is improved efficiently.

The density of the aluminum alloy of 6000 series or 7000 series is 2700 kg/m$^3$ to 2800 kg/m$^3$. Therefore, compared to the case where the whole bumper is made of steel 1.4 mm thick, in each example, the value of the right side of Expression 6 is about 4.1.

From Table 4, it can be seen that in any of the first to fourth examples, the thickness of the aluminum webs is smaller than about 4.1 mm, and Expression 6 is satisfied. In fact, as shown in Table 4, the weight ratio of each example is about 1 or less.

Figure 10:
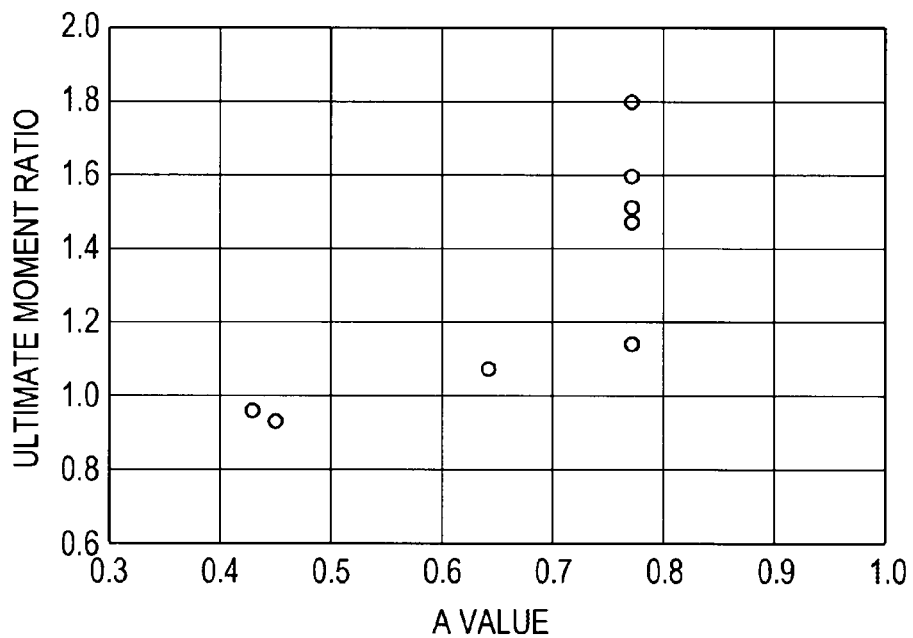
FIG. 10 is a plot of A value versus ultimate moment ratio about each example.

FIG. 10 is a plot of ultimate moment ratio versus A value about each example based on Table 4. According to Table 4 and FIG. 10, in the case where the A value is below 0.5 in the first example, that is to say, in the case where the intermediate web 6 is made of aluminum alloy of 7000 series and the thickness of the intermediate web 6 is 2.0 mm and in the case where the intermediate web 6 is made of aluminum alloy of 6000 series and the thickness of the intermediate web 6 is 3.6 mm, the ultimate moment ratio is below 1. That is to say, in these cases, sufficient strength cannot be ensured. For this reason, in the case where a material other than steel is used, it is preferable to select such a material that the A value is 0.5 or more.

(Outline of this Embodiment)

As described above, the bumpers 1 (bumpers 1a to 1d) of this embodiment have a front flange 2 and a rear flange 3 made of metal and forming the front surface and the rear surface, and an upper web 4 and a lower web 5 made of metal and forming the upper surface and the lower surface. Between the upper web 4 and the lower web 5, an intermediate web 6 made of metal is disposed. By this intermediate web 6, two hollow spaces 7 and 8 are formed within the bumper 1. At least one of the upper web 4, lower web 5, and intermediate web 6 is made of a material other than steel. As the material, a material satisfying the above Expression 1 is selected. Therefore, at least one of the webs is made of a material by which the buckling strength per weight can be easily ensured.

In any of the bumpers 1a to 1d according to the first to fourth examples, the intermediate web 6 is made of a material other than steel. Of the webs, the intermediate web 6 is disposed in the middle, and therefore the balance of strength of the whole bumper is kept by making the intermediate web 6 of a material other than steel.

In the bumper 1b according to the second example, the upper web 4, lower web 5, and intermediate web 6 are all made of a material other than steel. Therefore, the overall weight can be reduced further.

In the bumper 1c or 1d according to the third or fourth examples, reinforcing plates 31, 32, 41 that reinforce the corners of the outer shape member 11 are provided. By these, the bending durability of the whole bumper can be improved.

In this embodiment, a material other than steel is selected so as to satisfy Expression 6, and therefore the weight can be reduced to less than that in the case where the whole bumper is made of steel.

In this embodiment, a material other than steel is selected such that the A value defined by Expression 7 is 0.5 or more, and therefore the bending durability can be ensured.

(Other Modifications)

Although the embodiment of the present invention has been described, it is to be understood that the present invention is not limited to the above-described embodiment, and various changes may be made therein within the range of the above description.

For example, although in the above-described embodiment, the webs are made of aluminum alloy, the webs may be made of another metal material.

Although in the above-described embodiment, the joining method is not particularly specified, a method having sufficient joining strength, such as welding, bonding, or bolting, can be used.

This application is based on Japanese Patent Application (Patent Application No. 2009-117814) filed May 14, 2009, which is hereby incorporated by reference herein in its entirety.

Industrial Applicability

The present invention can be used as a bumper structure attached to the body of an automobile.

Reference Signs List

| | |
|---|---|
| 1, 1a to 1d | bumper |
| 2 | front flange |
| 3 | rear flange |
| 4 | upper web |
| 5 | lower web |
| 6 | intermediate web |
| 31, 32, 41 | reinforcing plate |

The invention claimed is:

1. A bumper structure comprising:
a front flange and a rear flange comprising metal and forming a front surface and a rear surface of the bumper structure, respectively;
an upper web and a lower web comprising metal and forming a upper surface and a lower surface of the bumper structure, respectively; and
an intermediate web comprising metal,
wherein the front flange, the rear flange, the upper web, and the lower web are connected to each other so as to form a box shape comprising a hollow space therein,
wherein the intermediate web is connected to the front flange and the rear flange between the upper web and the lower web such that the hollow space is divided into an upper portion and a lower portion,
wherein, of the front flange, the rear flange, the upper web, the lower web, and the intermediate web, at least one of the upper web, the lower web, and the intermediate web is made of a second material, and the others are made of a first material, and
wherein, the first material and second material satisfy an equation:

$$E_1/\rho_1^3 < E_2/\rho_2^3,$$

wherein
the Young's modulus and density of the first material are $E_1$ and $\rho_1$, respectively, and
the Young's modulus and density of the second material are $E_2$ and $\rho_2$, respectively.

2. The bumper structure of claim 1, wherein the intermediate web is made of the second material.

3. The bumper structure of claim 1, wherein the upper web, the lower web, and the intermediate web are made of the second material.

4. The bumper structure of claim 1, wherein the intermediate web is made of the second material, and
wherein a reinforcing plate comprising metal is fixed to each of a surface of a corner formed by the front flange and the upper web and a surface of a corner formed by the front flange and the lower web, and
wherein the reinforcing plate is bent into a hook shape along each corner.

5. The bumper structure of claim 1, wherein the first material and second material satisfy an equation:

$$t_2 \leq (\rho_1/\rho_2) \cdot t_1,$$

wherein the thickness of each web made of the second material is $t_2$, and a thickness of a part made of the first material is $t_1$.

6. The bumper structure of claim 1, wherein the first material and second material satisfy an equation:

$$(t_2 \cdot \sigma y_2)/(t_1 \cdot \sigma y_1) \geq 0.5,$$

wherein the thickness of each web made of the second material is $t_2$, the thickness of a part made of the first material is $t_1$, the yield stress of the first material is $\sigma y_1$, and the yield stress of the second material is $\sigma y_1$.

7. The bumper structure of claim 2, wherein the first material and second material satisfy an equation:

$$t_2 \leq (\rho_1/\rho_2) \cdot t_1,$$

wherein the thickness of each web made of the second material is $t_2$, and a thickness of a part made of the first material is $t_1$.

8. The bumper structure of claim 3, wherein the first material and second material satisfy an equation:

$$t_2 \leq (\rho_1/\rho_2) \cdot t_1,$$

wherein the thickness of each web made of the second material is $t_2$, and a thickness of a part made of the first material is $t_1$.

9. The bumper structure of claim 4, wherein the first material and second material satisfy an equation:

$$t_2 \leq (\rho_1/\rho_2) \cdot t_1,$$

wherein the thickness of each web made of the second material is $t_2$, and a thickness of a part made of the first material is $t_1$.

10. The bumper structure of claim 2, wherein the first material and second material satisfy an equation:

$$(t_2 \cdot \sigma y_2)/(t_1 \cdot \sigma y_1) \geq 0.5,$$

wherein the thickness of each web made of the second material is $t_2$, the thickness of a part made of the first material is $t_1$, the yield stress of the first material is $\sigma_1$, and the yield stress of the second material is $\sigma_1$.

11. The bumper structure of claim 3, wherein the first material and second material satisfy an equation:

$$(t_2 \cdot \sigma y_2)/(t_1 \cdot \sigma y_1) \geq 0.5,$$

wherein the thickness of each web made of the second material is $t_2$, the thickness of a part made of the first material is $t_1$, the yield stress of the first material is $\sigma y_1$, and the yield stress of the second material is $\sigma y_1$.

12. The bumper structure of claim 4, wherein the first material and second material satisfy an equation:

$$(t_2 \cdot \sigma y_2)/(t_1 \cdot \sigma y_1) \geq 0.5,$$

wherein the thickness of each web made of the second material is $t_2$, the thickness of a part made of the first material is $t_1$, the yield stress of the first material is $\sigma y_1$, and the yield stress of the second material is $\sigma y_1$.

13. The bumper structure of claim 1, wherein the upper web and the lower web are both disposed substantially perpendicularly to the front flange and the rear flange, and are equal to each other in length.

14. The bumper structure of claim 2, wherein the upper web and the lower web are both disposed substantially perpendicularly to the front flange and the rear flange, and are equal to each other in length.

15. The bumper structure of claim 3, wherein the upper web and the lower web are both disposed substantially perpendicularly to the front flange and the rear flange, and are equal to each other in length.

16. The bumper structure of claim 4, wherein the upper web and the lower web are both disposed substantially perpendicularly to the front flange and the rear flange, and are equal to each other in length.

17. The bumper structure of claim 5, wherein the upper web and the lower web are both disposed substantially perpendicularly to the front flange and the rear flange, and are equal to each other in length.

18. The bumper structure of claim 6, wherein the upper web and the lower web are both disposed substantially perpendicularly to the front flange and the rear flange, and are equal to each other in length.

* * * * *